United States Patent Office 3,294,152
Patented Dec. 27, 1966

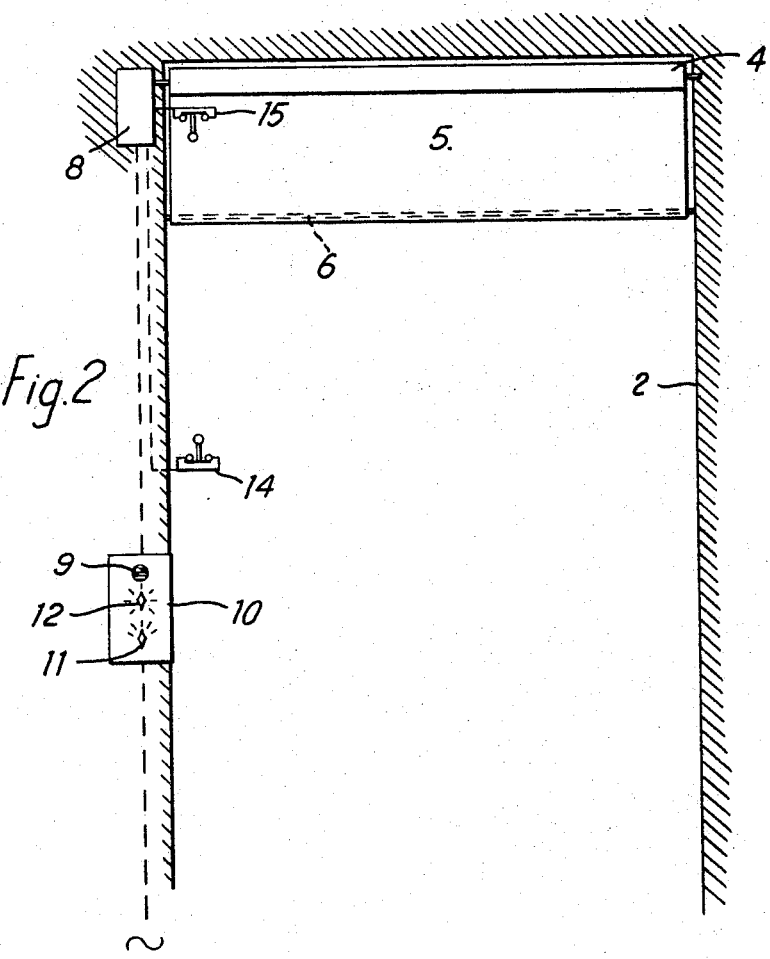
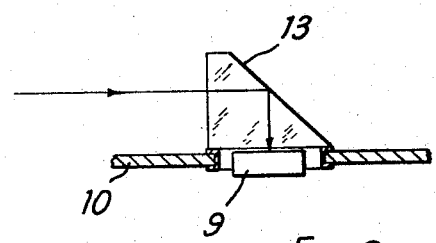

3,294,152
WINDOW SCREENS
Arend Willem Kuijvenhoven, Chestnut House, Barrowby,
Grantham, England
Filed Mar. 27, 1964, Ser. No. 355,389
Claims priority, application Great Britain, Apr. 3, 1963,
13,249/63
7 Claims. (Cl. 160—5)

This invention relates to window screens, that is to say curtains or blinds for screening windows against the sun.

In modern buildings, windows are of large area and there is a requirement for preventing excessive admission of radiation from the sun so that the heat and light conditions in rooms can be kept within the limits necessary for comfortable living and efficient working conditions.

Venetian blinds are widely used but are not found satisfactory because they require frequent adjustment, have limited efficiency as regards reflection of radiant heat, virtually exclude all sunlight when closed and cleaning of the large number of slats is laborious.

The present invention is based on a study of the conditions which affect living and working conditions in buildings and on the nature of radiation from the sun.

To be comfortable and efficient indoors, human beings require the conditions of temperature and light intensity to be controlled within certain limits.

The condition "temperature" is really a sense of heat or cold, which is not absolute, but depends on the warmth of the air, radiation from artificial means when present, the radiation from the sun, the humidity of the air and the speed of any air movement.

The condition "light intensity" depends on the actual outside light intensity, the size of the windows, constructional features of the windows and the room and, when using artificial light, on the power, design and layout of the illumination equipment.

The two conditions indoors are therefore influenced by outdoor climatic conditions and by indoor artificial means and structure.

A person working in a room usually has artificial light and heating means or air-conditioning equipment at his disposal.

An office worker, for example, will require a light intensity of say 500 lux on his desk, supplied either by natural or artificial means. He will also require a temperature of about 20° C. resulting from control of natural or artificial heating conditions.

There is transmitted, through windows, natural light and heat from the sun in great variety, depending on the time of year, time of day and prevailing weather conditions.

The following variables and other factors may be stated:

(a) The natural light may vary from 0 to 100,000 lux (of which only 500 lux may be needed).

(b) The natural radiated heat may vary from 0 to 1,000 watt/m.$^2$. In a room with 5 m.$^2$ of window area this would give up to 5,000 watts in the room.

(c) The outside temperature may vary from −30° C. to +45° C.

(d) The artificial light may give, for example, 500 lux as required but the power used to produce this, as well as the incidental heating, is wasteful if natural light is being excluded at the same time.

(e) Air-conditioning may give the required heat control say to about 20° C., but it costs money on which a saving could be achieved through heat retention or radiation control.

(f) In winter, heat losses occur to the outside of a building. In summer, heat radiates to the inside of a building.

Consideration of the above factors shows the need for an automatic control system to regulate room light intensity and the reflection of outside natural heat or retention of inside artificial heat so as to achieve comfort and efficiency for human beings as well as financial economy.

From investigation of the nature of solar radiation reaching the earth it appears that, for a given clearness of the atmosphere, the radiation energy from the sun is within certain limits independent of the atmospheric temperature and therefore independent of summer and winter and of geographical latitude. It can also be shown that radiation energy is to a first order of approximation directly proportional to light intensity. There exists therefore a useful relationship between natural heat and natural light and this can be expressed as a characteristic of radiation energy for light intensity.

It has already been proposed to control a window blind or shutter automatically by means of a light-sensitive electrical device which is exposed to direct radiation from the sun.

The present invention provides apparatus screening a room against solar radiation through a window of the room, comprising a window curtain and means controlled by a light-sensitive device for moving the curtain to vary window area covered by the curtain and, according to the invention, the curtain is of a material which will both reflect and transmit solar radiation and the light sensitive device is located inside the room.

Thus, the apparatus operates according to conditions inside the room and more effective control is obtained than with a device simply exposed directly to the sun.

Preferably, the curtain material is a metallised sheet material, particularly woven textile material which has been metallised by deposit of vapourised metal in high vacuum.

Such metallised textile material can be made to provide a highly reflective, but diffusing, surface which is permeable, through the interstices of the weave, and is also translucent.

Such material also is flexible so that a curtain can be made like a roller blind to be pulled more or less across a window to permit full solar radiation through an uncovered part of a window and limited radiation through another, curtained, part or to cover or uncover the window completely.

A light-sensitive cell can be adjusted to cause movement of the curtain consequent on change from any given level of light intensity.

It can be shown that, although the actual values of natural light intensity are different in different parts of a room, there is a substantially constant relationship between the light intensities measured in parallel directions in different parts of a room. For example, the variation of natural light incident on the top of a desk in a room will have a substantially constant relationship to the variation of light incident on a horizontal surface anywhere in the room.

This factor is utilised in the present invention by providing means, such as a rotatable reflecting prism, for adjusting the light-sensitive device to receive light in a given direction according to the kind of control required. For example, the device can be orientated upwards, for control according to illumination at a desk, or horizontally, for illumination at a particular wall of a room, for viewing pictures.

The invention is illustrated diagrammatically on the accompanying drawings, in which:

FIG. 2 is an inside elevation of part of a window.

FIG. 3 is a detail view and

Figure 1:
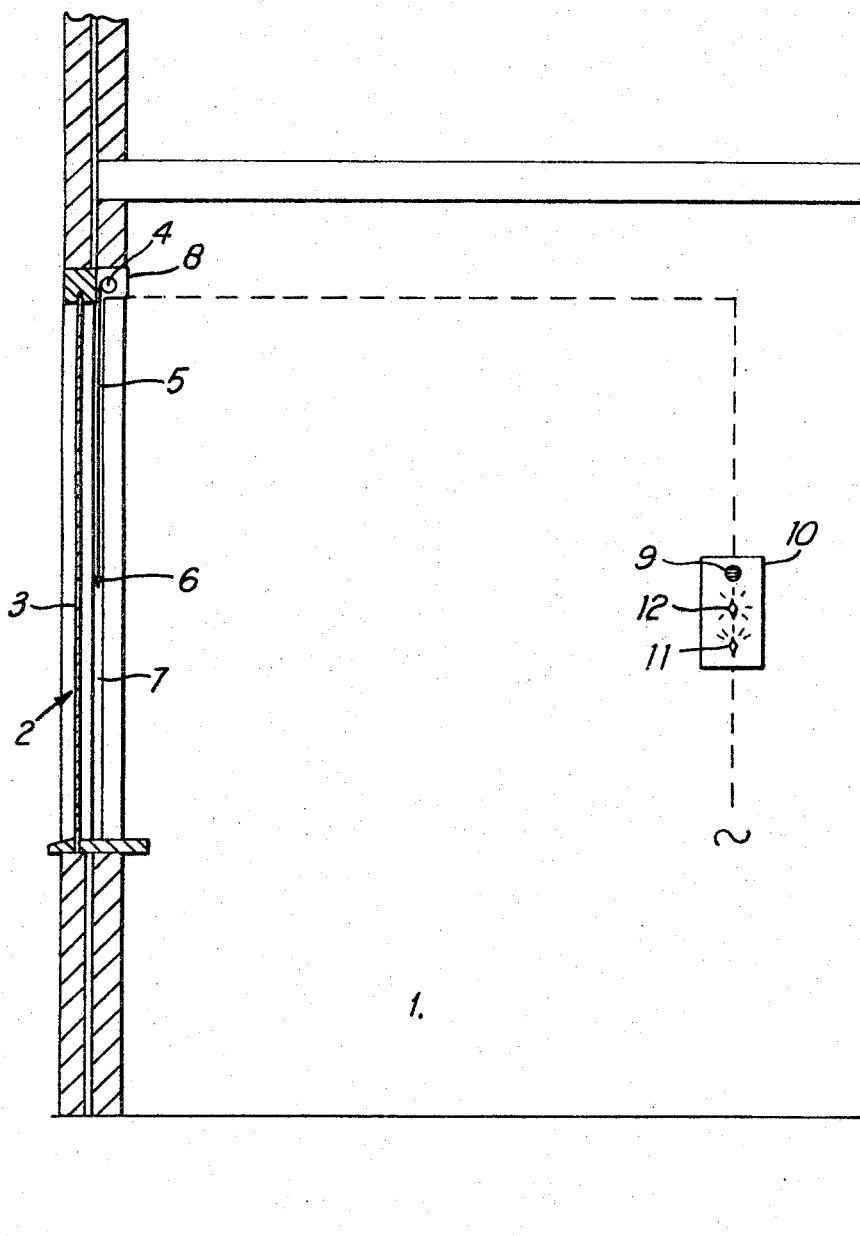
FIG. 1 is a sectional elevation of a room fitted with the apparatus.

In the drawings, a room 1 has a window aperture 2 with glazing 3. Within the window aperture 2 there is mounted, at the top, a roller 4 on which is wound a curtain 5, of vacuum-metallised woven textile material, having its lower edge stiffened and weighted by a rod 6 which slides in guide-slots 7 in the sides of the window aperture and is heavy enough to keep the unwound part of the curtain 5 taut.

The curtain roller 4 is driven by a small reversible induction motor and reduction gear (not shown) in a box 8 so as to raise or lower the curtain 5 slowly under the control of a photo-conductive cell 9 on a control panel 10 which also has a manual control switch 11 and a regulator 12 for adjusting the sensitivity of the apparatus to a required light intensity.

When the natural light intensity in the room rises above the required value, the cell 9 operates a control to cause the motor to lower the curtain and vice versa. The motor is arranged to drive the curtain roller at only a low speed so that the curtain moves slowly, e.g., 1 metre per minute, and small transient light changes, due to passing clouds, do not make any substantial difference to the position of the curtain.

To enable the occupant of the room to suit the light to his requirements, the photo-conductive cell may be provided with a reflecting prism 13 (FIG. 3) mounted as a rotatable cover to direct incident light from any direction in one plane on to the cell 9. The control panel may itself be mounted to turn about another axis, or may be portable on a flexible electric lead, to allow any required orientation or position in the room.

To switch off the motor automatically in the fully lowered and fully raised positions of the curtain, limit switches 14 and 15 are provided and these may in practice be provided in the gear box 8 with an operating device driven at an appropriate gear ratio.

Figure 4:
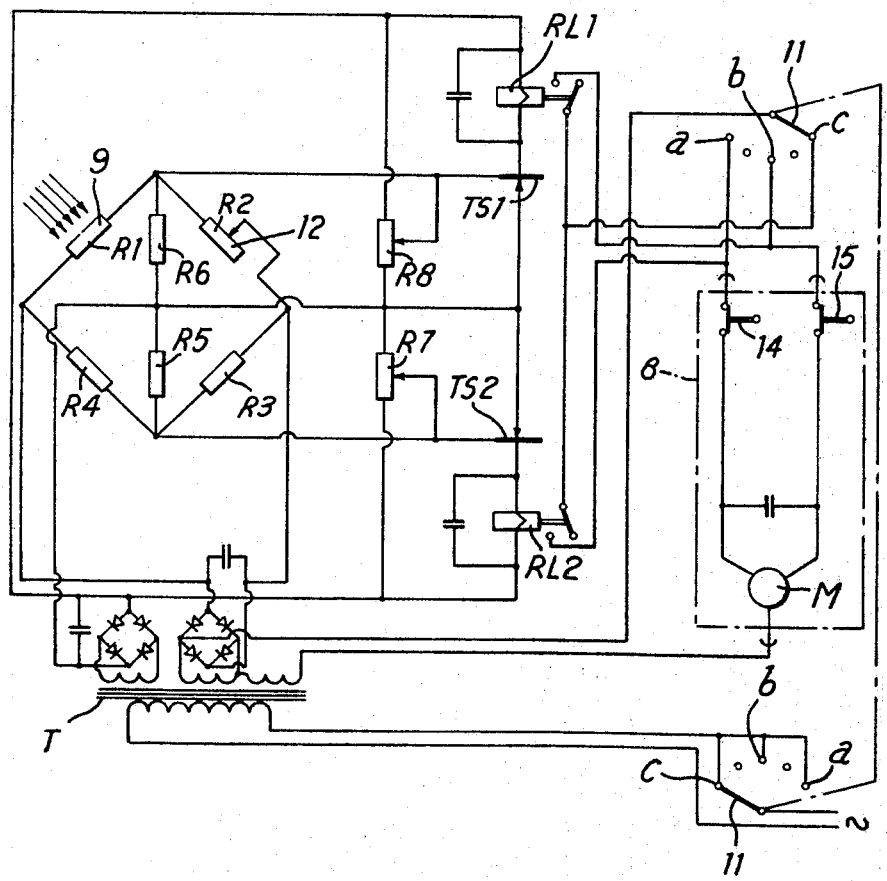
FIG. 4 is a circuit diagram.

In the circuit diagram (FIG. 4) the photo-conductive cell 9 is connected as a resistor R1 in a Wheatstone bridge with a variable resistor R2 and two fixed resistors R3 and R4.

The circuit is calibrated so that when the resistor R2 has been set, by the regulator 12, to a given value for a required light intensity in the room, say 500 lux on a desk top, the bridge is only balanced when the cell 9 (resistor R1) is exposed to a corresponding intensity of incident light. Above or below that value, the bridge is unbalanced and a consequent voltage across resistor R5 or R6 will cause the transistor TS1 or TS2 to operate the relay RL1 or RL2, respectively, to switch on the motor M in one direction or the other to rotate the curtain roller 4 in the appropriate direction to lower or raise the curtain 5.

The bridge and motor circuits respectively are energized from a main supply transformer T and separate rectifiers as shown and variable resistors R7 and R8 are provided for adjustment of the operating voltages of the transistors.

The manual control switch 11 has positions $a$ and $b$ for direct control of the motor M to lower or raise the curtain respectively and a position $c$ for automatic control through the cell 9. The limit switches 14 and 15 are shown in the motor circuit and the gear box 8 is also indicated.

To the extent to which the curtain covers the window, it will reflect solar radiation while transmitting sufficient light to give a useful intensity in the room. Thus the curtain will reflect heat while preserving illumination at a required level.

It will be apparent that the control system could be modified, particularly as regards the construction or form and movement of the curtain.

For example, a curtain or curtains could be moved horizontally, from one or both sides of a window, to suit windows in buildings at latitudes where the sun has a low apparent orbit.

The design of any particular window screen installation in accordance with the invention and the way in which it is used will of course depend upon the climatic conditions for the location.

The preferred curtain material, metallised textile material, can be made to reflect up to, for example, between 80% and 90% of radiated heat while still transmitting, for example, 10% to 20% of the light.

The conditions under which window screening is most needed are those of high solar radiation, when protection is required from glare and heat radiation through windows, and very low or no solar radiation, when prevention of heat loss through windows is required.

An indoor light intensity of 1000 lux is more than adequate for all ordinary purposes and, as this can be given by 10% transmission through a curtain of solar radiation at some 10,000 lux, in sunny weather the curtain will be fully closed to give maximum heat reflection while transmitting enough light.

When solar radiation falls below that which will give the required natural light intensity indoors, say 10,000 lux, the light-sensitive cell will operate to commence opening of the curtain and as the indoor light intensity continues to fall, the curtain will be opened further until it is fully open.

The curtain control will therefore need to operate only in the lower regions of outdoor light and heat intensity. Consequently, full solar radiation will only be admitted through an unscreened window area when its heat intensity is low and the need for its reflection no longer exists.

Heat retention at night, when required, can be achieved by interconnecting the curtain control and an artificial light switch, so that when the light is switched on the curtain is drawn to cover the window.

In general, the present invention provides a window screen system which gives preference to the use of natural light, if available, over the use of artificial light which, in daytime, usually involves wasteful use of power and the production of unwanted heat.

Under some conditions however, the insulation of windows against heat transmission, for reflection of solar heat or retention of artificial heat, may be given preference over the use of natural light and the curtain control system could then be combined with an artificial light control system so as to utilise artificial light under some conditions.

I claim:

1. Apparatus for screening a room against solar radiation incident upon a surface in the room comprising, a window curtain of a material that will both reflect and transmit solar radiation, a light sensitive device within the room, means controlled by the light sensitive device for moving the curtain to vary the window area covered by the curtain, said light sensitive device being positioned to receive light of an intensity which bears a substantially constant relationship to the intensity of the light incident upon the said surface, the said device being positioned to receive and respond to both light passing directly through the window to the said surface and light passing through the window and the curtain material to the said surface.

2. An apparatus according to claim 1 wherein the light sensitive device is constructed to receive light in substantially one plane, and including an orienting means for varying the effective orientation of the said plane within the room.

3. An apparatus according to claim 2 wherein the said orienting means comprises a reflecting prism which is adapted to direct light to the said light sensitive device and which is movably mounted with respect to the said light sensitive device.

4. Apparatus according to claim 1, in which the light-sensitive device is a photo-conductive cell arranged as a resistor in one arm of a Wheatstone bridge of which another arm is a variable resistor, and a reversible induction motor is provided to move the curtain through a reduction gear drive and the Wheatstone bridge is connected so that its output controls the motor to run in one direction or the other, the motor being controlled by a pair of relays operated respectively by a pair of transistors connected across the Wheatstone bridge.

5. An apparatus for controlling the intensity of solar light incident upon an object in a room which has an opening through which the room is exposed to solar radiation comprising, a curtain mounted to cover at least part of the said opening, said curtain being of a material that will both reflect and transmit solar radiation, a light sensitive device positioned to receive light of an intensity which bears a substantially constant relationship to the intensity of the light incident upon the said object being controlled regardless of the amount of the opening area covered by the said curtain, and means controlled by the said light sensitive device for moving the curtain to vary the area of the opening covered by the said curtain, the said light sensitive device being positioned to receive and respond to both light passing directly through the opening to the object and light passing through the opening and through the curtain material to the object.

6. An apparatus according to claim 5 wherein the light sensitive device is constructed to receive light in substantially one plane, and including an orienting means for varying the effective orientation of the said plane within the room.

7. An apparatus according to claim 6 wherein the said orienting means comprises a reflecting prism which is adapted to direct light to the said light sensitive device and which is movably mounted with respect to the said light sensitive device.

References Cited by the Examiner

UNITED STATES PATENTS

| | | | |
|---|---|---|---|
| 1,739,005 | 12/1929 | Karolus | 250—210 X |
| 2,050,737 | 8/1936 | Schviever | 250—210 |
| 2,083,726 | 6/1937 | Mason | 160—5 X |
| 2,437,323 | 3/1948 | Heigl et al. | 250—210 X |
| 2,673,935 | 3/1954 | Waldhauer | 250—210 |
| 2,774,421 | 12/1956 | Lion | 160—238 |

HARRISON R. MOSELEY, *Primary Examiner.*

P. M. CAUN, *Assistant Examiner.*